US010629226B1

(12) United States Patent
Tong et al.

(10) Patent No.: US 10,629,226 B1
(45) Date of Patent: Apr. 21, 2020

(54) ACOUSTIC SIGNAL PROCESSING WITH VOICE ACTIVITY DETECTOR HAVING PROCESSOR IN AN IDLE STATE

(71) Applicant: BESTECHNIC (SHANGHAI) CO., LTD., Shanghai (CN)

(72) Inventors: Weifeng Tong, Shanghai (CN); Qian Li, Shanghai (CN); Liang Zhang, Shanghai (CN)

(73) Assignee: BESTECHNIC (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/396,763

(22) Filed: Apr. 29, 2019

(30) Foreign Application Priority Data

Oct. 29, 2018 (CN) .......................... 2018 1 1269025
Mar. 18, 2019 (CN) .......................... 2019 1 0202246

(51) Int. Cl.
G10L 25/78 (2013.01)
G10L 15/24 (2013.01)
G10L 25/06 (2013.01)
G10L 15/08 (2006.01)
G10L 15/22 (2006.01)
G10L 15/02 (2006.01)

(52) U.S. Cl.
CPC .............. G10L 25/78 (2013.01); G10L 15/02 (2013.01); G10L 15/08 (2013.01); G10L 15/22 (2013.01); G10L 25/06 (2013.01); G10L 2015/025 (2013.01); G10L 2015/088 (2013.01)

(58) Field of Classification Search
CPC ......... G10L 15/04; G10L 15/20; G10L 15/24; G10L 25/06; G10L 25/78; G10L 25/93

USPC ....... 704/210, 215, 216, 218, 233, 251, 205, 704/237
See application file for complete search history.

(56) References Cited

U.S. PATENT DOCUMENTS

| | | | | |
|---|---|---|---|---|
| 4,081,607 A * | 3/1978 | Vitols | ..................... | G10L 15/10 704/237 |
| 4,393,271 A * | 7/1983 | Fujinami | ................. | G10L 15/00 704/235 |
| 8,655,655 B2 * | 2/2014 | Wang | ...................... | G10L 25/48 704/237 |
| 10,230,346 B2 * | 3/2019 | Jing | ........................ | G10L 25/78 |
| 2005/0131691 A1 * | 6/2005 | Fischer | ................... | G10L 15/26 704/246 |
| 2009/0254338 A1 * | 10/2009 | Chan | ................... | G10L 21/0272 704/205 |
| 2011/0288860 A1 * | 11/2011 | Schevciw | ............... | G10L 25/78 704/233 |
| 2011/0307249 A1 * | 12/2011 | Kellermann | ........ | G10L 21/0208 704/226 |
| 2014/0029762 A1 * | 1/2014 | Xie | ......................... | G10L 25/93 381/94.1 |
| 2014/0122078 A1 * | 5/2014 | Joshi | ....................... | G10L 15/28 704/251 |

(Continued)

Primary Examiner — Martin Lerner
(74) Attorney, Agent, or Firm — Bayes PLLC

(57) ABSTRACT

System and method for acoustic signal processing are disclosed. An exemplary device for acoustic signal processing includes a voice activity detector configured to detect a speech of a user. The device includes a microphone configured to receive acoustic signals from the user. The device further includes at least one processor configured to process the acoustic signals in response to detecting the speech of the user. The at least one processor is in an idle state before the speech of the user is detected.

19 Claims, 9 Drawing Sheets

(56) References Cited

U.S. PATENT DOCUMENTS

| | | | |
|---|---|---|---|
| 2014/0142949 A1* | 5/2014 | Newman | G10L 15/26 704/275 |
| 2014/0193009 A1* | 7/2014 | Yousefian Jazi | G10L 21/0208 381/317 |
| 2014/0257821 A1* | 9/2014 | Adams | G10L 25/93 704/275 |
| 2016/0275966 A1* | 9/2016 | Jazi | G10L 21/0208 |
| 2017/0092294 A1* | 3/2017 | Togawa | G10L 25/06 |
| 2017/0309293 A1* | 10/2017 | Lee | G10L 21/0232 |
| 2017/0365249 A1* | 12/2017 | Dusan | G10L 25/78 |
| 2018/0090158 A1* | 3/2018 | Jensen | G10L 25/90 |
| 2018/0324518 A1* | 11/2018 | Dusan | G10L 25/78 |
| 2019/0043520 A1* | 2/2019 | Kar | G10L 21/0232 |
| 2019/0335273 A1* | 10/2019 | Kato | G10L 25/06 |

* cited by examiner

ACOUSTIC SIGNAL PROCESSING WITH VOICE ACTIVITY DETECTOR HAVING PROCESSOR IN AN IDLE STATE

CROSS-REFERENCE TO RELATED APPLICATIONS

This application claims the benefit of priority to Chinese Patent Application No. 201811269025.6 filed on Oct. 29, 2018, which is incorporated herein by reference in its entirety.

TECHNICAL FIELD

The present disclosure relates to the field of signal processing, and more particularly to systems and methods for acoustic signal processing.

BACKGROUND

With the development of communication technology, smart headphones including wireless Bluetooth headphones draw more and more attention. Taking wireless binaural Bluetooth headphone as an example, it is popular among consumers due to the hearing enjoyment it brings to consumers via binaural call and binaural stereo music playback. In order to provide users with more convenient user experience, voice assistant is applied to headphones as well. Moreover, the power consumption of headphones with voice assistant is usually very high, and the speech recognition is not accurate.

SUMMARY

In a first aspect, a device for acoustic signal processing is disclosed. The device may include a voice activity detector configured to detect a speech of a user. The device may also include a microphone configured to receive an acoustic signal from the user. The device may further include at least one processor configured to process the acoustic signal in response to detecting the speech of the user. The at least one processor may be in an idle state before the speech of the user is detected.

In a second aspect, a device for acoustic signal processing is disclosed. The device may include a microphone configured to receive an acoustic signal from a user. The device may also include a sensor configured to detect phonation related signals from the user. The device may further include at least one processor. The at least one processor may be configured to compute a correlation coefficient between the acoustic signal and the phonation related signals and detect a speech of the user based on the correlation coefficient.

In a third aspect, a device for acoustic signal processing is disclosed. The device may include a microphone configured to receive an acoustic signal from a user. The device may also include an analog-to-digital converter (ADC) configured to digitalize the acoustic signal to generate a digitalized acoustic signal. The device may further include an analog circuit configured to detect a first speech of the user based on the acoustic signal. The device may further include a digital circuit configured to detect a second speech of the user based on the digitalized acoustic signal. The device may further include at least one processor configured to perform keyword detection and/or speech recognition on the digitalized acoustic signal. The at least one processor may be in an idle state before the second speech is detected.

In a fourth aspect, a system for acoustic signal processing is disclosed. The system may include an acoustic signal processing device and a computing device. The acoustic signal processing device may include a voice activity detector configured to detect a speech of a user. The acoustic signal processing device may also include a microphone configured to receive an acoustic signal from the user. The acoustic signal processing device may further include at least one processor configured to process the acoustic signal in response to detecting the speech of the user. The at least one processor may be in an idle state before the speech of the user is detected. The computing device may be configured to perform keyword detection on the processed acoustic signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
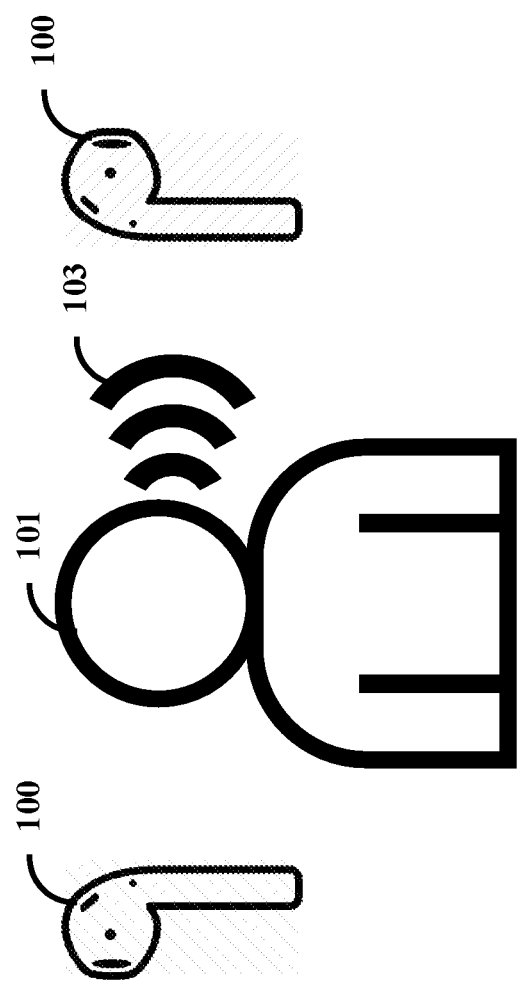
FIG. 1 illustrates a schematic diagram of an exemplary acoustic signal processing device, according to some embodiments of the present disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be disclosed in detail below, among other novel features, an acoustic signal processing device disclosed herein can reduce power consumption during voice activity detection. When performing the voice activity detection, the processor of the acoustic signal processing device is in an idle state. The processor will be turned for processing acoustic signals after voice activity detection is completed. In this manner, the acoustic signal processing device works in low power mode and the overall power consumption is reduced.

Moreover, the acoustic signal processing device includes a microphone, the microphone includes an internal storage configured to acquire acoustic signals of a predetermined time interval. In this manner, the processor can obtain contextual acoustic signals including acoustic signals acquired both before and after voice activity detection, which further increases the performance of keyword detection.

Further, the acoustic signal processing device can detect a speech of a user by calculating a correlation coefficient between a phonation related signal (e.g., vibrations) and an acoustic signal. The correlation coefficient is used to compute a detected quantity. The detected quantity is compared to a preset threshold to determine whether the speech of the user is detected.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 illustrates a schematic diagram of an exemplary acoustic signal processing device 100, according to some embodiments of the present disclosure. As shown in FIG. 1, acoustic signal processing device 100 may be used by user 101 for audio signal processing. The audio signal processing may include at least one of voice activity detection, keyword detection, or speech recognition.

In some embodiments, acoustic signal processing device 100 may be a headphone. The headphone may include a wired or a wireless headphone. The wireless headphone may include a wireless binaural Bluetooth headphone.

In some embodiments, acoustic signal processing device 100 may receive acoustic signal 103 from user 101 and detect a speech of user 101 in acoustic signal 103. After the speech of user 101 is detected, acoustic signal processing device 100 may perform keyword detection and/or speech recognition on acoustic signal 103. For example, acoustic signal processing device 100 may include a microphone for receiving acoustic signal 103.

In some embodiments, acoustic signal processing device 100 may include a sensor for detecting phonation related signals (not shown) of user 101. The phonation related signals may include at least one of vibrations signals, acoustic signals, or electronic signals. Consistent with some embodiments of the present disclosure, acoustic signal processing device 100 may detect a speech of user 101 based on the phonation related signals. For example, acoustic signal processing device 100 may perform voice activity detection on the phonation related signals to detect the speech of user 101. Furthermore, acoustic signal processing device 100 may perform keyword detection and/or speech recognition on acoustic signal 103 after the speech of user 101 is detected. The sensor may include an inertial sensor (e.g., accelerometer, gyroscopes, etc.), a bone conduction sensor, etc.

In some embodiments, acoustic signal processing device 100 may communicate with a computing device. The computing device may include a speech recognition module configured to perform speech recognition on acoustic signals received from acoustic signal processing device 100. Consistent with some embodiments, the computing device may include a keyword detection module configured to perform keyword detection on acoustic signals received from acoustic signal processing device 100.

Figure 2:
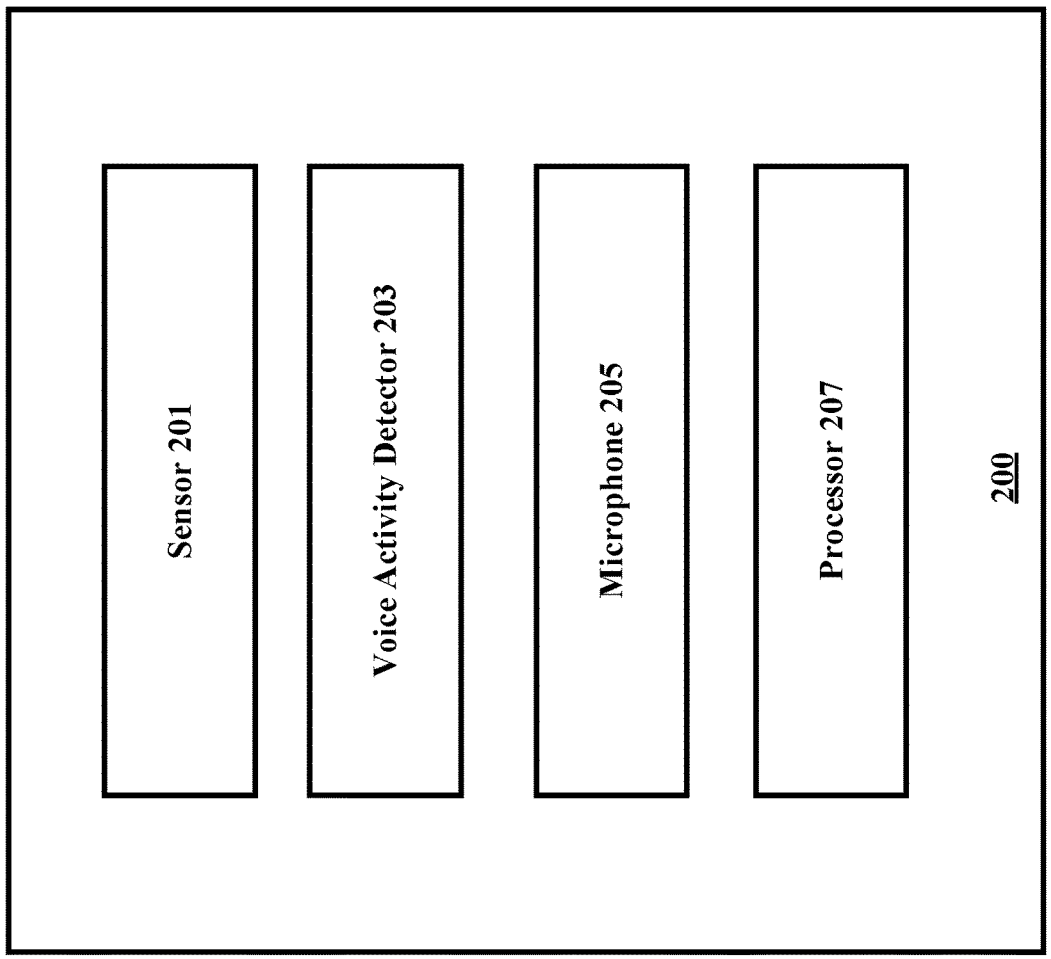
FIG. 2 illustrates a block diagram of an exemplary acoustic signal processing device, according to some embodiments of the present disclosure.

FIG. 2 illustrates a block diagram of an exemplary acoustic signal processing device 200, according to some embodiments of the present disclosure. As shown in FIG. 2, acoustic signal processing device 200 may include a sensor 201, a voice activity detector 203, a microphone 205, and a processor 207.

In some embodiments, acoustic signal processing device 200 may be a headphone. The headphone may include a wired or a wireless headphone. The wireless headphone may include a wireless binaural Bluetooth headphone.

Sensor 201 may be used to detect phonation related signals from a user of acoustic signal processing device 200. The phonation related signals may include at least one of vibrations signals, acoustic signals, or electronic signals. In some embodiments, sensor 201 may be an accelerometer, the accelerometer may be used to detect vibrations from a user. The vibrations may be used for voice activity detection. In alternative embodiments, sensor 201 may include at least one of a motion sensor, a speech sensor, or a bone conduction sensor for detecting vibrations from a user.

Voice activity detector 203 may be used to detect the speech of a user. In some embodiments, voice activity detector 203 may receive phonation related signals from sensor 201, and detect the speech of the user based on the phonation related signals. In alternative embodiments, voice activity detector 203 may receive acoustic signals from microphone 205 and detect the speech of the user based on the acoustic signals. Consistent with some embodiments, voice activity detector may perform a fusion on vibrations and acoustics signals received from sensor 201 and microphone 205, and detect the speech of the user based on the fusion of the vibrations and the acoustic signals.

In some embodiments, voice activity detector 203 may be implemented as an analog circuit for performing voice activity detection.

Microphone 205 may receive acoustic signals from a user. In some embodiments, microphone 205 may be a digital microphone with an internal storage for storing acoustic signals. In alternative embodiments, microphone 205 may be an analog microphone.

Processor 207 may process acoustic signals from a user. In some embodiments, processor 207 may receive acoustic signals from microphone 205, and process the acoustic signals. Consistent with some embodiments of the present disclosure, processor 207 may process the acoustic signals after a speech of a user is detected by voice activity detector 203. For example, voice activity detector 203 may detect the speech of the user based on the phonation related signals detected by sensor 201. Upon the detection of the speech of the user, voice activity detector 203 may send a voice activity detection (VAD) signal to processor 207. The VAD signal is used to indicate that the speech of the user is detected. Processor 207 may receive the VAD signal from voice activity detector 203 and parse the VAD signal to initiate the processing of the acoustic signals. The processing may include keyword detection and/or speech recognition. For example, processor 207 may include a keyword detection module for performing keyword detection. As another example, processor 207 may include a speech recognition module for performing speech recognition.

In some embodiments, keyword detection on acoustic signals may be performed after a speech of a user is detected in voice activity detection. During voice activity detection, only sensor 201 and voice activity detector 203 are in an operating state, processor 207 may be shut down. For example, processor 207 may not receive acoustic signals from microphone 205 and may not perform keyword detection on the acoustic signals. In this manner, acoustic signal processing device 200 may work in low power mode, the overall power consumption may be reduced. Moreover, performing voice activity detection before keyword detection can ensure that acoustic signals received by processor 207 include the speech of the user.

In some embodiments, processor 207 may be in an idle state before a speech of a user is detected. For example, processor 207 may run under a 32 kHz crystal clock. As another example, processor 207 may be shut down before the speech is detected. Consistent with some embodiments, processor 207 may run under a 26 MHz or 24 MHz crystal clock with clock gating.

In some embodiments, acoustic signal processing device 200 may communicate with a computing device and interact with a software (e.g., an application) installed on the computing device. For example, acoustic signal processing device 200 may send acoustic signals to the computing device for further analysis (e.g., second keyword detection, speech recognition) after processor 207 detects keywords in the acoustic signals. The computing device may include a smart device and/or a cloud computing device. The smart device may include at least one of a smart phone, a tablet, a laptop, a desktop, a smart watch, or other wearable devices.

In some embodiments, a speech recognition software may be installed in the computing device (e.g., a smart device). Speech recognition may be performed in a cloud computing device which communicates with the computing device by calling the speech recognition software on the smart device. Consistent with some embodiments, the speech recognition software may be installed in the cloud computing device and the speech recognition may be performed in the cloud computing device.

In some embodiments, voice activity detector 203 and processor 207 may be integrated in a single chip. The chip may include at least one of a field-programmable gate array (FPGA), a digital signal processor (DSP), an application-specific integrated circuit (ASIC), or a system on chip (SoC).

Figure 3:
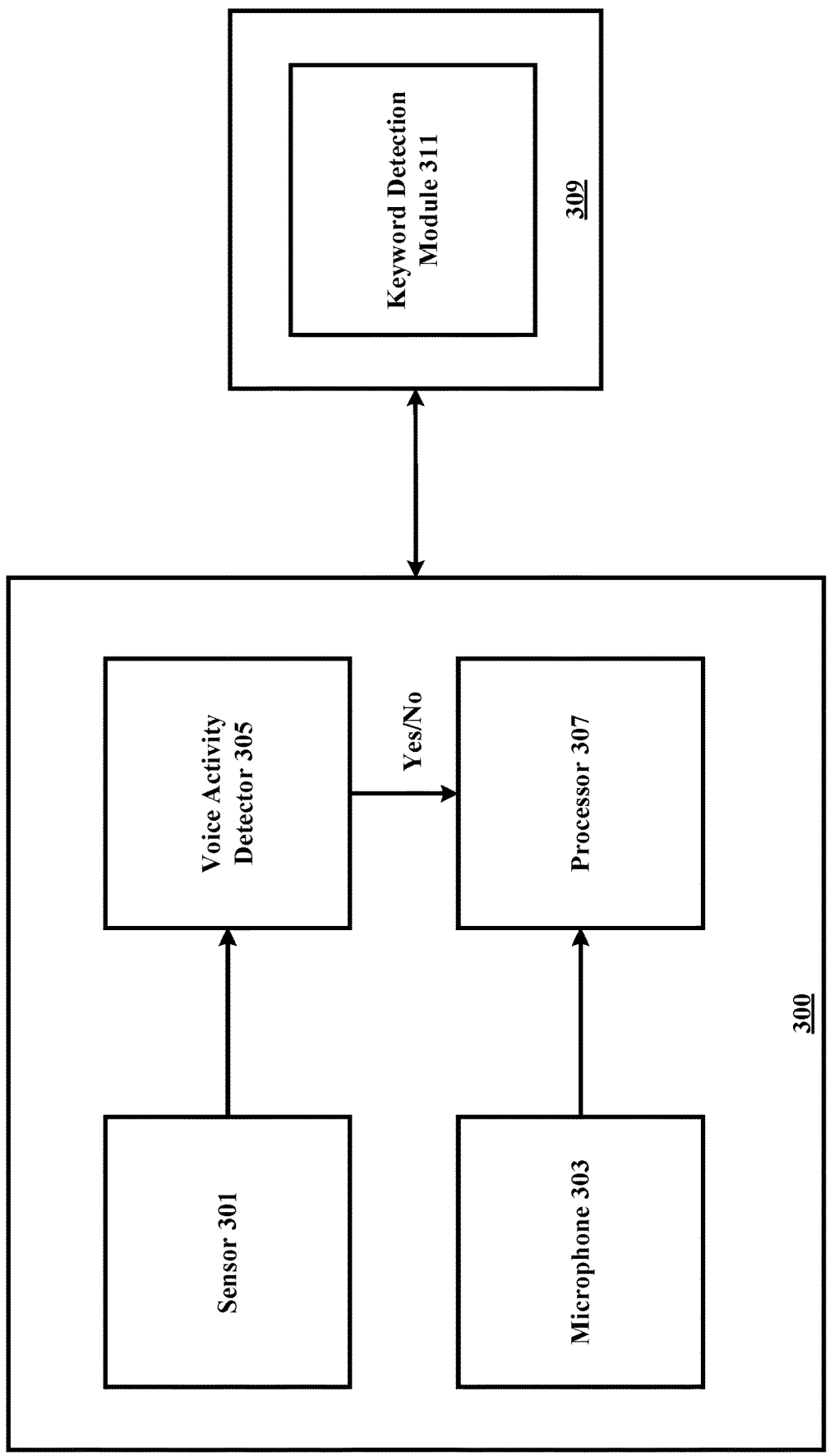
FIG. 3 illustrates a block diagram of an exemplary acoustic signal processing system, according to some embodiments of the present disclosure.

FIG. 3 illustrates a block diagram of an exemplary acoustic signal processing system including an acoustic signal processing device 300 and a computing device 309, according to some embodiments of the present disclosure. As shown in FIG. 3, acoustic signal processing device 300 may include a sensor 301, a voice activity detector 305, a microphone 303, and a processor 307. Computing device 309 may include a keyword detection module 311.

In some embodiments, keyword detection module 311 may be an application installed on computing device 309. Keyword detection module 311 may be configured to perform a second keyword detection on acoustic signals received from acoustic signal processing device 300 under the circumstance that a first keyword detection performed by processor 307 is completed with keywords detected. Computing device 309 may include a smart device and/or a cloud computing device. As smart devices and cloud computing devices own more powerful computation power and are able to share keyword detection experience (e.g., labeled datasets, training datasets, training results) via the Internet, keyword detection module 311 may verify the keyword detection result of processor 307 to obtain a more accurate and comprehensive keyword detection result.

In some embodiments, acoustic signal processing device 300 may be connected with computing device 309 based on a wired (e.g., cable) or wireless (e.g., WiFi, BLUETOOTH, NFC, RFID) manner.

In some embodiments, acoustic signal processing device 300 may be a headphone and sensor 301 may be an accelerometer. The accelerometer may be placed near the acoustic meatus of a user for detecting vibrations of the user. As an example, the vibrations acquired by the accelerometer may be sent to voice activity detector 305 for voice activity detection.

In some embodiments, microphone 303 may be a digital microphone. The vibrations acquired by sensor 301 (e.g., an accelerometer) and the acoustic signals acquired by microphone 303 may be sent to voice activity detector 305 respectively for voice activity detection.

In some embodiments, voice activity detector 305 may perform a fusion on the vibrations acquired by sensor 301 (e.g., an accelerometer) and the acoustic signals acquired by microphone 303, and detect the speech of the user based on the fusion of the vibrations and the acoustic signals. The fusion may enhance common components of the vibrations and the acoustic signals and effectively filter noises. Moreover, the enhancement of common components and filtering of noises may increase the accuracy of voice activity detection.

In some embodiments, the vibrations and the acoustic signals may be fused in accordance with various manners. For example, the vibrations and the acoustic signals may be fused based on a time-frequency transformation. The time-frequency transformation may include at least one of Fourier transform, Fast Fourier transform, or wavelet transform. Consistent with some embodiments, partial frequency band of the vibrations and the acoustic signals may be used for the fusion. For example, the high frequency part of the acoustic signals and the low frequency of the vibrations may be fused. In alternative embodiments, the result of the fusion may be compared to a threshold to determine whether a speech of a user is detected.

In some embodiments, voice activity detector 305 may compute a correlation coefficient between the vibrations and the acoustic signals for voice activity detection. For example, the correlation coefficient may be computed based on the vibrations and the acoustic signals in time domain. As another example, the correlation coefficient may be computed based on a frequency domain representation of the vibrations and a frequency domain representation of the acoustic signals. The correlation coefficient may be compared with a preset threshold. If the correlation coefficient is greater than the preset threshold, voice activity detector 305 may determine that a speech of a user is detected.

In some embodiments, microphone 303 may include a microphone array. Consistent with some embodiments, acoustic signals acquired by the microphone array may be synthesized to generate a synthesized signal.

In some embodiments, microphone 303 may include a storage (not shown) for storing acoustic signals. In some embodiments, microphone 303 may constantly acquire acoustic signals and store acoustic signals of a predetermined time interval (e.g., hundreds of milliseconds) into the storage.

In some embodiments, vibrations detected by sensor 301 (e.g., accelerometer) may be sent to voice activity detector 305 for voice activity detection, once a speech of a user is detected by voice activity detector 305 based on the vibrations, processor 307 may perform keyword detection on acoustic signals received from microphone 303. For example, upon the detection of the speech of the user, voice activity detector 305 may send a VAD signal to processor 307. The VAD signal is used to indicate that the speech of the user is detected. Processor 307 may receive the VAD signal from voice activity detector 305 and parse the VAD signal to initiate the processing of the acoustic signals.

In some embodiments, voice activity detection based on vibrations detected by sensor 301, acoustic signals acquired by microphone 303, or a fusion of the vibrations and the acoustic signal may need a certain amount of time. Due to the storage of microphone 303, processor 307 may acquire a predetermined time interval of acoustic signals before the speech of the user is detected. In this manner, processor 307 may obtain contextual acoustic signals including acoustic signals acquired both before and after the detection of the speech of the user, which may further increase the performance of keyword detection including reducing false alarm and missed detection. In some embodiments, keywords may be preset as words starting with voiced sound and/or vowel with a certain magnitude of vibration. In this manner, sensor 301 may acquire more robust vibrations, and the performance of voice activity detection may be increased.

It is to be appreciated that the description of the storage in microphone 303 is merely an example, and is not intended to limit the scope of the present disclosure. In some embodiments, acoustic signal processing device 300 may further include a storage for storing acoustic signals of a predetermined time interval. The storage may be connected with microphone 303 (e.g., digital microphone). The storage may receive acoustic signals from microphone 303 and store the acoustic signals. The storage may also be connected with processor 307. In this manner, after the speech of the user is detected, processor 307 may perform keyword detection and/or speech recognition by fetching acoustic signals from microphone 301 and the storage. In this manner, processor 307 may obtain contextual acoustic signals including acoustic signals acquired both before and after the time point when the speech of the user is detected, which may further increase the performance of keyword detection and/or speech recognition.

In some embodiments, voice activity detector 305 and processor 307 may have various implementations. For example, voice activity detector 305 and/or processor may include a memory and a processor. The memory may include instructions which can be executed by the processor for causing the processor to perform one or more methods as disclosed in the present disclosure. For example, the processor may include a general-purpose processing device such as a microcontroller. As another example, the processor may include one or more of a field-programmable gate array (FPGA), a digital signal processor (DSP), an application-specific integrated circuit (ASIC), and a system on chip (SoC).

In some embodiments, voice activity detector 305 and processor 307 may be integrated into a single chip (e.g., an SoC) which is disposed in acoustic signal processing device 300. When performing voice activity detection, only sensor 301, voice activity detector 305, and microphone 303 are in an operating mode. Other modules like processor 307 and keyword detection module 311 of computing device 309 are shut down. In this manner, the chip and computing device 309 both work in low power mode without receiving and processing acoustic signals from microphone 303, which may save computation resources.

In some embodiments, sensor 301 may output low frequency signals, for example, signals under 2 KHz or 1 KHz. Consistent with some embodiments, when a speech of a user is detected by voice activity detector 305, keyword detection may be performed by processor 307 on a fusion of vibrations detected by sensor 301 and acoustic signals received by microphone 303. Due to comprehensive coverage of frequency of the fusion, the performance of keyword detection may be increased. Further, the fusion of the vibrations and the acoustic signals may be sent to computing device 309.

In some embodiments, keyword detection may be performed based on machine learning (e.g., neural network). In alternative embodiments, keyword detection module 311 of computing device 309 may be configured to perform keyword detection based on machine learning. For example, when computing device 309 is a cloud computing device, the cloud computing device may have access to online labeled datasets, training datasets, and training results. Moreover, computing device 309 may include more powerful processors, even be able to obtain more powerful computation power through cloud services. When keywords are detected by acoustic signal processing device 300, acoustic signals may be sent to computing device 309 for a second keyword detection by keyword detection module 311. If the detection is successful, speech recognition may be initiated by computing device 309. In this manner, the keywords detected by processor 307 of acoustic signal processing device 300 may be verified by computing device 309, only approved keywords are used for speech recognition, which reduces error detection and the consumption of computation resource on wrong keywords.

In some embodiments, computing device 309 may include a smart device and a cloud computing device which is communicating with the smart device. Computing device 309 may further include a speech recognition module (not shown) set in the cloud computing device. The speech recognition module may be configured to perform speech recognition on acoustic signals acquired by acoustic signal processing device 300. Benefiting from labeled datasets and training results shared online and more powerful computation power of distribution computation, speech recognition may be effectively performed. Consistent with some embodiments, the speech recognition module may be enabled when keywords are detected by keyword detection module 311, and perform speech recognition on keywords verified and/or detected by keyword detection module 311.

Figure 4:
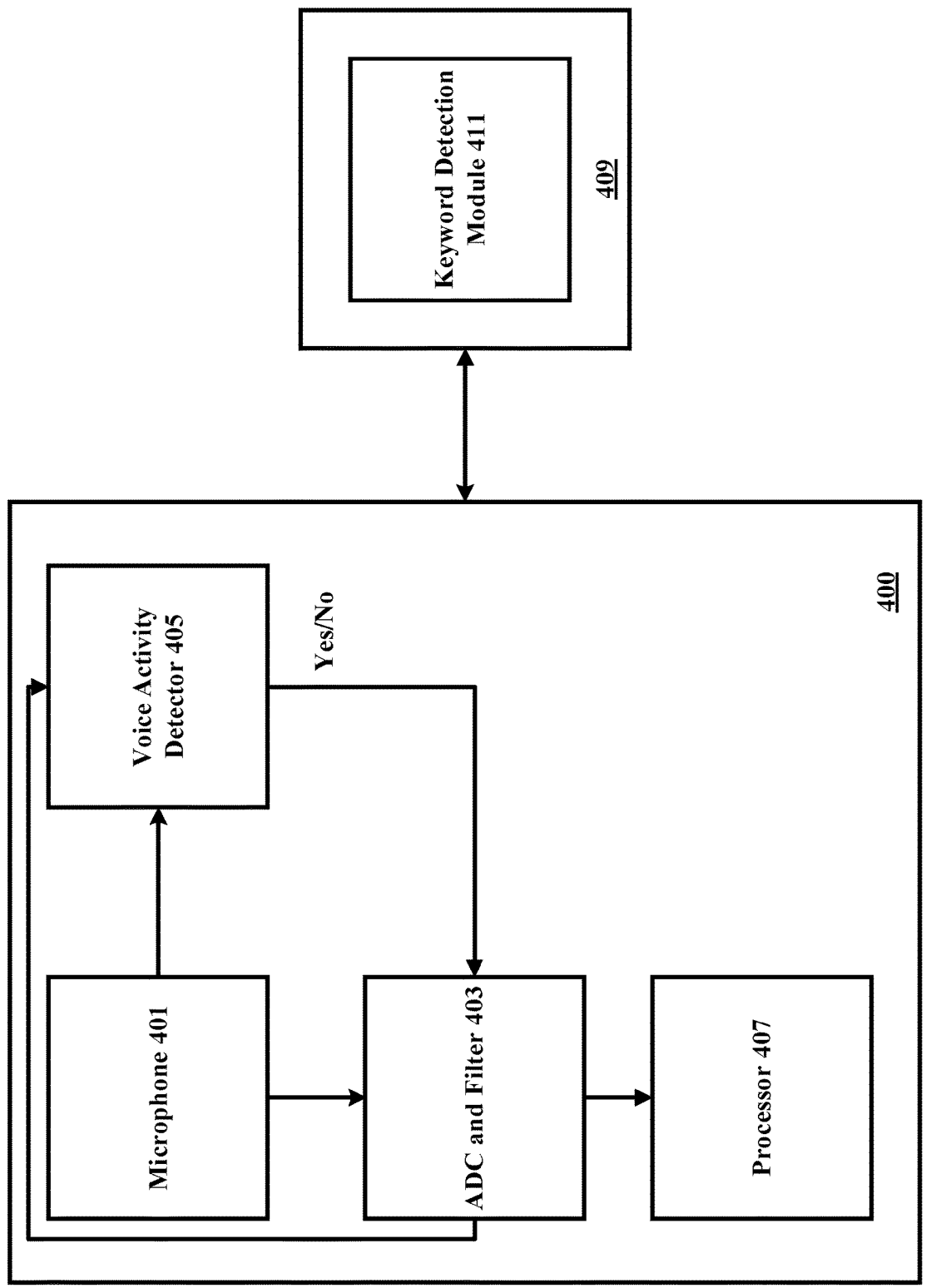
FIG. 4 illustrates a block diagram of an exemplary acoustic signal processing system, according to some embodiments of the present disclosure.

FIG. 4 illustrates a block diagram of an exemplary acoustic signal processing system including an acoustic signal processing device 400 and a computing device 409, according to some embodiments of the present disclosure. It should be noted that acoustic signal processing device 400 and computing device 409 include similar components and connection manners as acoustic signal processing device 300 in FIG. 3, the description of these components and connection manners will be omitted herein.

Acoustic signal processing device 400 may include a microphone 401, a voice activity detector 405, an analog-to-digital converter (ADC) and filter 403, and a processor 407. Computing device 409 may include a keyword detection module 411. The interaction of processor 407 and keyword detection module 411 may refer to the embodiments as described in FIG. 3, and will be omitted herein. Computing device 409 may include a smart device and/or a cloud computing device which is communicating with the smart device. The descriptions of the speech recognition module and the cloud computing device in FIG. 3 may be applicable and will be omitted herein.

Microphone 401 (e.g., analog microphone) may be used to acquire acoustic signals and send the acoustic signals to voice activity detector 405 for voice activity detection. In some embodiments, voice activity detector 405 may be implemented as an analog circuit with delay within a few milliseconds. In alternative embodiments, voice activity detector 405, ADC and filter 403, and processor 407 may be integrated in a single chip (e.g., binaural chip). In this manner, during voice activity detection, modules like ADC and filter 403, digital circuits on the chip, crystal and clock may be shut down, only microphone 401 and voice activity detector 405 are in an operating mode. This implementation can reduce power consumption during voice activity detection. ADC and filter 403 and processor 407 will be turned on after a speech of a user is detected in the voice activity detection. As shown in FIG. 4, after voice activity detector 405 detects a speech of a user in acoustic signals acquired by microphone 401, microphone 401 may send subsequently acquired acoustic signals to ADC and filter 403 and processor 407 for keyword detection. By implementing voice activity detector as an analog circuit, the delay will be within a few milliseconds. In this manner, very little acoustic signals will be lost after a speech of a user is detected.

Referring to FIG. 4, microphone 401 is multiplexed as the data source to both voice activity detector 405 and processor 407, which simplifies the internal structure of acoustic signal processing device 400. Moreover, in alternative embodiments, ADC and filter 403 may be integrated in processor 407.

In some embodiments, two voice activity detections (VAD 1 and VAD 2) may be performed on acoustic signals received by microphone 401. For example, voice activity detector 405 may include an analog circuit and a digital circuit. VAD 1 may be performed by the analog circuit on acoustic signals received by microphone 401 (e.g., headphone). When a first speech of a user is detected in VAD 1, voice activity detector 405 may be configured to turn on ADC and filter 403 for digitalizing the acoustic signals from microphone 401. The digitalized acoustic signals may be sent to the digital circuit for VAD 2. If a second speech of the user is detected in VAD 2, ADC and filter 403 may be enabled by voice activity detector 405 to send the digitalized acoustic signals to processor 407 for keyword detection and/or speech recognition. It is to be appreciated that ADC and filter 403 and processor 407 are shut down before the first speech is detected in VAD 1, processor 407 is shut down before the second speech is detected in VAD 2. In this manner, the overall power consumption can be reduced.

In some embodiment, acoustic signal processing device 400 may further include a storage (not shown) for storing acoustic signals of a predetermined time interval (e.g., 100 ms). For example, the storage may be connected with ADC and filter 403, and used to receive and store digitalized acoustic signals from ADC and filter 403. The storage may also be connected with processor 407. In this manner, after the second speech is detected, processor 407 may perform keyword detection and/or speech recognition by fetching acoustic signals from ADC and filter 403 and the storage. In this manner, processor 407 may obtain contextual acoustic signals including acoustic signals acquired both before and after the time point when the second speech is detected, which may further increase the performance of keyword detection and/or speech recognition.

Figure 5:
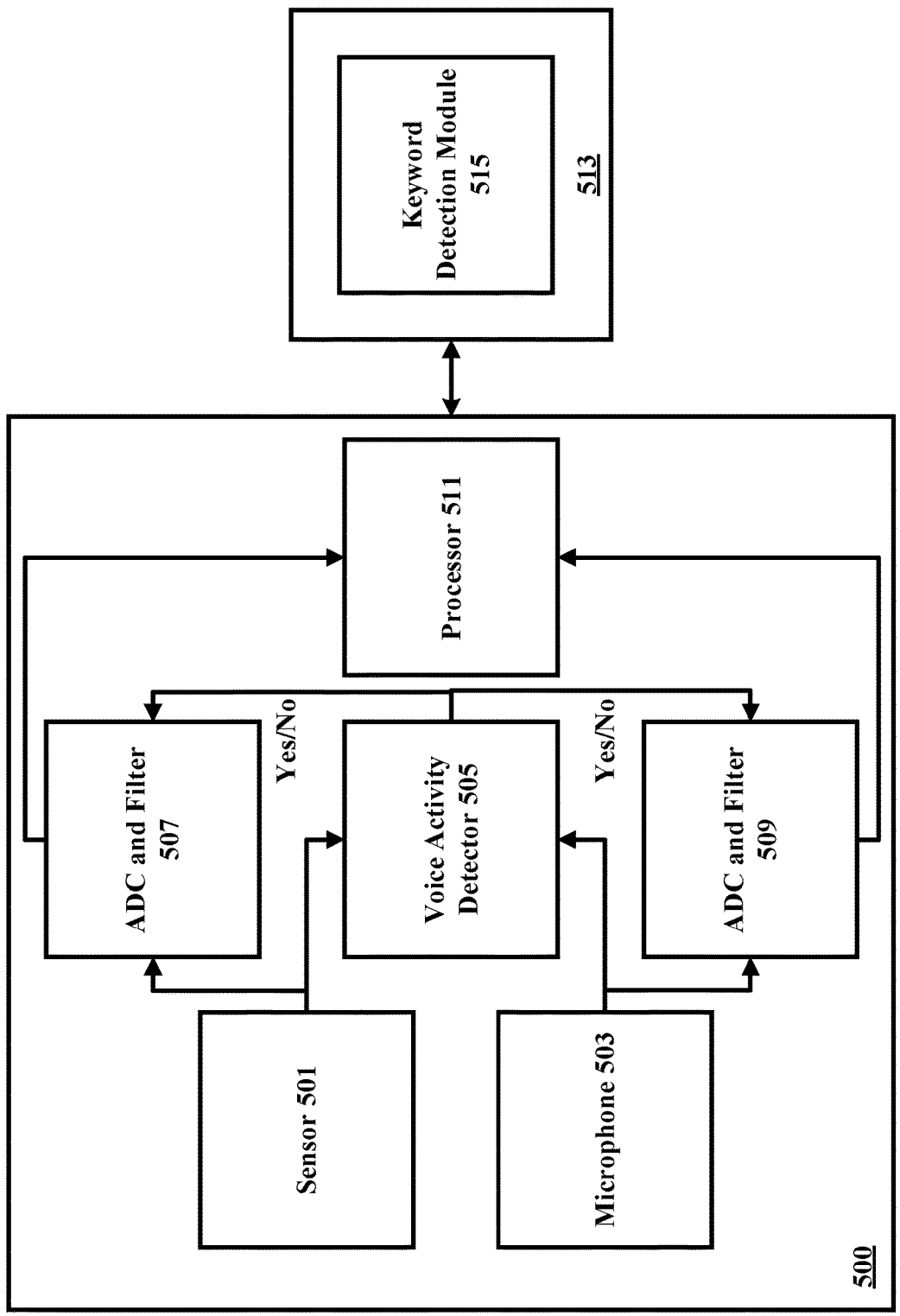
FIG. 5 illustrates a block diagram of an exemplary acoustic signal processing system, according to some embodiments of the present disclosure.

FIG. 5 illustrates a block diagram of an exemplary acoustic signal processing system including an acoustic signal processing device 500 and a computing device 513, according to some embodiments of the present disclosure. It should be noted acoustic signal processing device 500 and computing device 513 include similar components and connection manners as acoustic signal processing device 300 in FIG. 3, the description of the components and the connection manners will be omitted herein. The interaction of processor 511 and keyword detection module 515 may refer to the embodiments as described in FIG. 3, and will be omitted herein. Computing device 513 may include a smart device and a cloud computing device which is communicated with the smart device. The descriptions of the speech recognition module and the cloud computing device in FIG. 3 may be applicable and will be omitted herein.

As shown in FIG. 5, acoustic signal processing device 500 may include a sensor 501, a voice activity detector 505, a microphone 503, an ADC and filter 507, an ADC and filter 509, and a processor 511. The difference between FIG. 3 and FIG. 4 is, either voice activity detector 505 and processor 511 has 2 signal sources: one is sensor 501, another one is microphone 503.

In some embodiments, acoustic signal processing device 500 may be a headphone and sensor 501 may be an accelerometer configured for detecting vibrations from a user, microphone 503 may be an analog microphone configured for acquiring acoustic signals from the user. Consistent with some embodiments, vibrations acquired by the accelerometer and acoustic signals acquired by the analog microphone may be sent to voice activity detector 505 as phonation related signals for voice activity detection. Sensor 501 may output low frequency signals (e.g., under 2 KHz or 1 KHz). The vibrations of low frequency signals and the acoustic signals may cover a broader frequency range, which makes voice activity detection more accurate. In some embodiments, the vibrations detected by sensor 501 and the acoustic signals acquired by microphone 503 may be fused and used to perform voice activity detection by voice activity detector 505. In some embodiments, the vibrations detected by sensor 501 and the acoustic signals acquired by microphone 503 may be used for performing two voice activity detections respectively, the results of the two voice activity detections may be fused, the fusion may include cross validation, cross correction correlation, and cross supplement.

In some embodiments, voice activity detector 505, ADC and filter 507 and 509, and processor 511 may be integrated into a single chip (e.g., binaural chip). In this manner, during voice activity detection, ADC and filter 507 and 509, digital circuits on the chip, crystal clock may be shut down, only sensor 501, microphone 503 and voice activity detector 505 are in an operating mode, which reduces power consumption during voice activity detection. Consistent with some embodiments, either sensor 501 and voice activity detector 505 or microphone 503 and voice activity detector 505 are in an operating mode during voice activity detection. After a speech of a user is detected in the voice activity detection, ADC and filter 507 and 509 and processor 511 may be turned on. In some embodiments, voice activity detector 505 may be implemented as an analog circuit with a delay within a few milliseconds. Moreover, sensor 501 may be connected with the chip via an analog interface, further connected with voice activity detector 505, which reduces the cost of the whole circuit.

As shown in FIG. 5, after voice activity detector 505 detects a speech of a user in acoustic signals detected by microphone 503 or vibrations acquired by sensor 501, subsequent vibrations and acoustic signals acquired by sensor 501 and microphone 503 may be sent to ADC and filter 507 and 509 respectively. After finishing filtering, the vibrations and acoustic signals may be sent to processor 511 for keyword detection. By implementing voice activity detector 505 as an analog circuit, the delay will be within a few milliseconds. In this manner, very little acoustic signals will be lost after a speech of a user is detected.

In some embodiments, vibrations detected by sensor 501 and acoustic signals acquired by microphone 503 may be fused for performing keyword detection. The fused signals may cover a broader frequency range, which may increase the performance of keyword detection. Further, the fused signals with keywords detected may be sent to computing device 513 for a second keyword detection and speech recognition.

Figure 6:
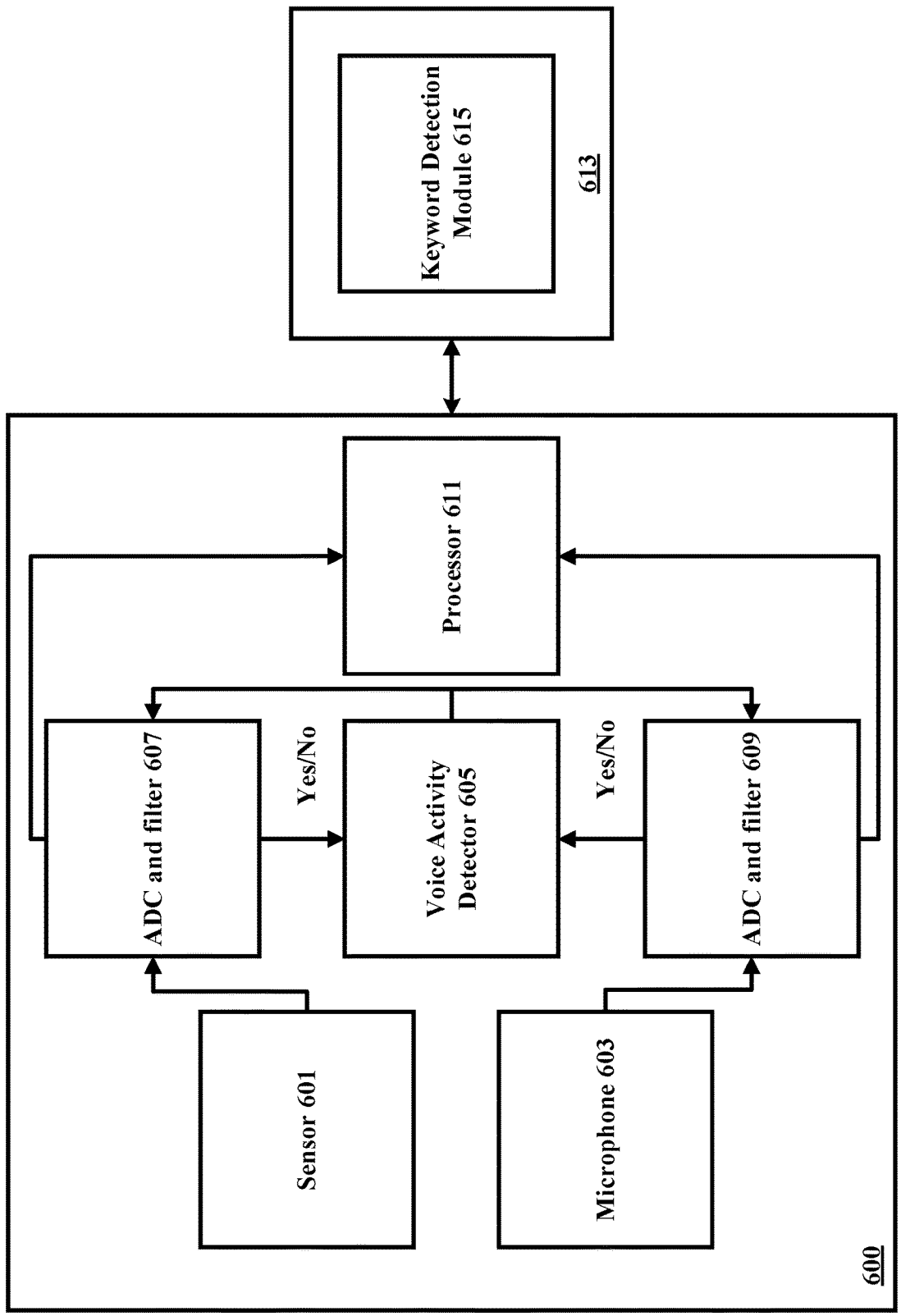
FIG. 6 illustrates a block diagram of an exemplary acoustic signal processing system, according to some embodiments of the present disclosure.

FIG. 6 illustrates a block diagram of an exemplary acoustic signal processing system including an acoustic signal processing device 600 and a computing device 613, according to some embodiments of the present disclosure. Acoustic signal processing device 600 may include a sensor 601, a voice activity detector 605, a microphone 603, an ADC and filter 607, an ADC and filter 609, and a processor 611. Computing device 613 may include a keyword detection module 615.

As shown in FIG. 6, vibrations output by sensor 601 (e.g., accelerometer) may be sent to ADC and filter 607 for analog to digital conversion and filtering. The acoustic signals output by microphone 603 may be sent to ADC and filter 609 for analog to digital conversion and filtering. The vibrations and the acoustic signals after analog to digital conversion and filtering may be sent to voice activity detector 605 respectively or collectively for voice activity detection.

In some embodiments, voice activity detector 605 may receive vibrations from sensor 601 solely as input. For example, voice activity detector 605 may receive vibrations directly from sensor 601 as input. As another example, voice activity detector 605 may receive ADC converted and filtered vibrations from ADC and filter 607 as input.

In some embodiments, voice activity detector 605 may receive acoustic signals from microphone 603 solely as input. For example, voice activity detector 605 may receive acoustic signals directly from microphone 603 as input. As another example, voice activity detector 605 may receive ADC converted and filtered acoustic signals from ADC and filter 609 as input.

In some embodiments, vibrations detected by sensor 601 or signals generated by converting and filtering the vibrations with ADC and filter 607 may be determined as a first phonation related signal. Acoustic signals acquired by microphone 603 or signals generated by converting and filtering the acoustic signals with ADC and filter 609 may be determined as a second phonation related signal. The first phonation related signal and the second phonation related signal may be sent to voice activity detector 605 for voice activity detection. The voice activity detection result may be more accurate based on the first phonation related signal and the second phonation related signal.

In some embodiments, a fusion may be performed on the first phonation related signal and the second phonation related signal for voice activity detection. The fusion may enhance common components of vibrations and acoustic signals, which may filter noise more effectively. The fused signal with enhanced common components and reduced noise may increase the accuracy of voice activity detection.

In some embodiments, vibrations detected by sensor 601 or signals generated by converting and filtering the vibrations with ADC and filter 607 and acoustic signals acquired by microphone 603 or signals generated by converting and filtering the acoustic signals with ADC and filter 609 may be processed for voice activity detection. For example, the vibrations and the acoustic signals may be converted to frequency domain. The conversion may include at least one of Fourier transform, Fast Fourier transform, or wavelet transform. In some embodiments, partial frequency band of the vibrations and the acoustic signals may be selected for processing. For example, the high frequency part of the acoustic signals and the low frequency of the vibrations may be fused. Consistent with some embodiments, the result of the processing may be compared with a threshold to determine whether a speech of a user is detected.

In some embodiments, microphone 603 may include an array of microphones. Consistent with some embodiment, acoustic signals acquired by the microphone array may be synthesized to generate a synthesized signal.

Figure 7:
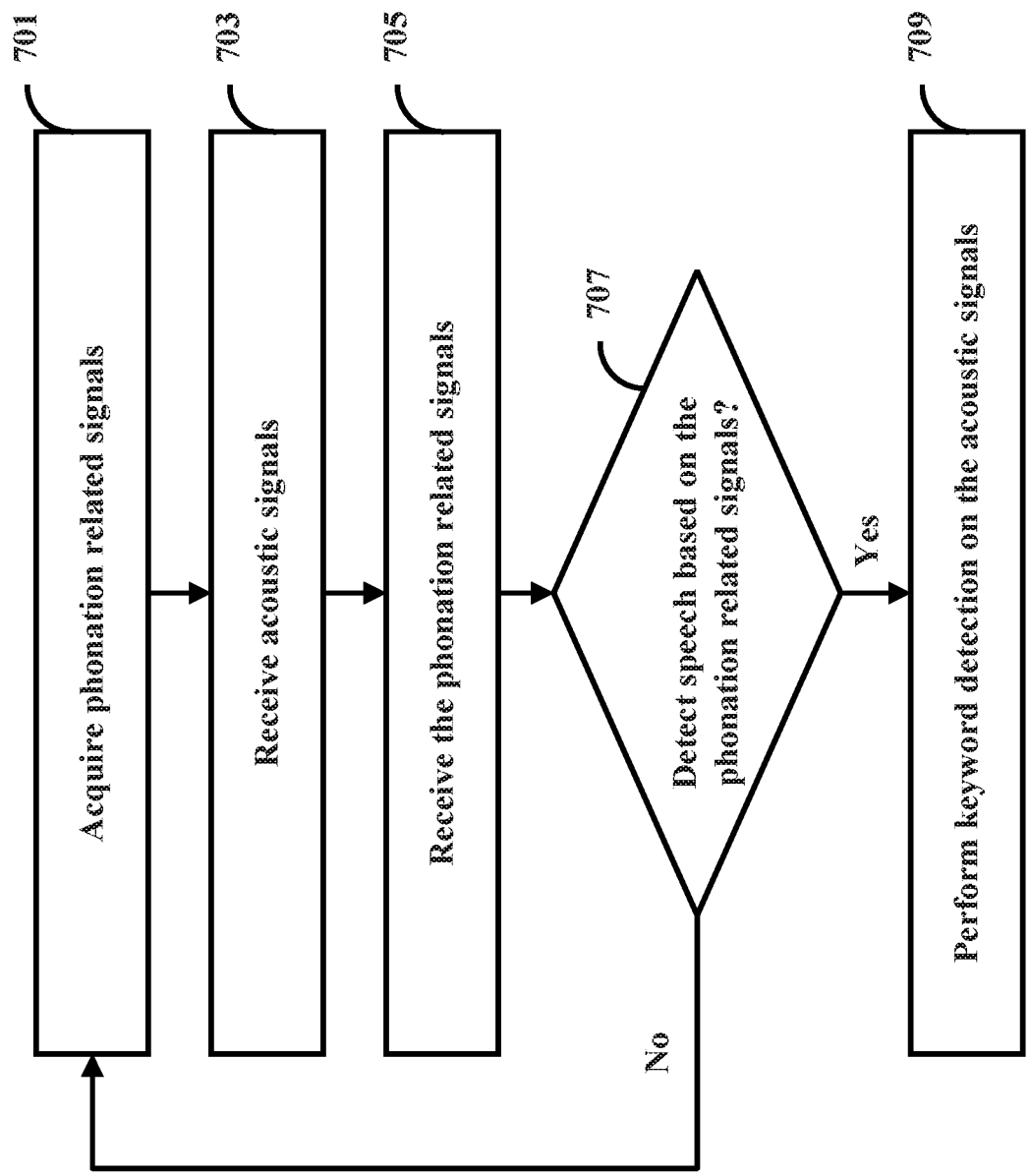
FIG. 7 illustrates a flowchart of an acoustic signal processing method, according to some embodiments of the present disclosure.

FIG. 7 illustrates a flowchart of an acoustic signals processing method, according to some embodiments of the present disclosure. The method as depicted by the flowchart may be performed by one or more of the acoustic signal processing devices as described above, for example, acoustic signal processing device 100 to 600. It is to be appreciated that not all operations may be needed to perform the disclosure provided herein. Further, some of the operations may be performed simultaneously, or in a different order than shown in FIG. 7, as will be understood by a person of ordinary skill in the art.

In 701, a sensor of an acoustic signal processing device may acquire phonation related signals. The phonation related signals may include at least one of vibrations signals, acoustic signals, or electronic signals. The sensor may include an inertial sensor (e.g., accelerometer or a gyroscope), a bone conduction sensor, etc.

In some embodiments, the phonation related signals acquired by the sensor may be sent to a voice activity detector of the acoustic signal processing device for voice activity detection.

In 703, a microphone of the acoustic signal processing device may acquire acoustic signals. In some embodiments, the microphone may be a digital microphone with an internal storage for storing acoustic signals. In alternative embodiments, the microphone may be an analog microphone.

In some embodiments, the acoustic signals acquired by the microphone may be sent to the voice activity detector as phonation related signal for voice activity detection.

In 705, the sensor of the acoustic signal processing device may receive the phonation related signals.

In 707, a voice activity detector of the acoustic signal processing device may detect a speech of a user based on the phonation related signals. In some embodiments, the voice activity detector may detect the speech of the user based on vibrations detected by the sensor.

If the speech of the user is detected in 707, a processor of the acoustic signal processing device may perform keyword detection on the acoustic signals in 709. If the speech of the user is not detected, the sensor of the acoustic signal processing device may continue to acquire phonation related signals for voice activity detection.

In some embodiments, the processor may be in an idle state before the speech of the user is detected. For example, the processor may run under a 32 kHz crystal clock. As another example, the processor may be shut down before the speech is detected. Consistent with some embodiments, the processor may run under a 26 MHz or 24 MHz crystal clock with clock gating.

In some embodiments, the operations of the method in FIG. 7 may be iteratively performed by the acoustic signal processing device to process acoustic signals.

In some embodiments, the operations as described in FIG. 7 may be performed by the acoustic signal processing device sequentially or concurrently.

Figure 8:
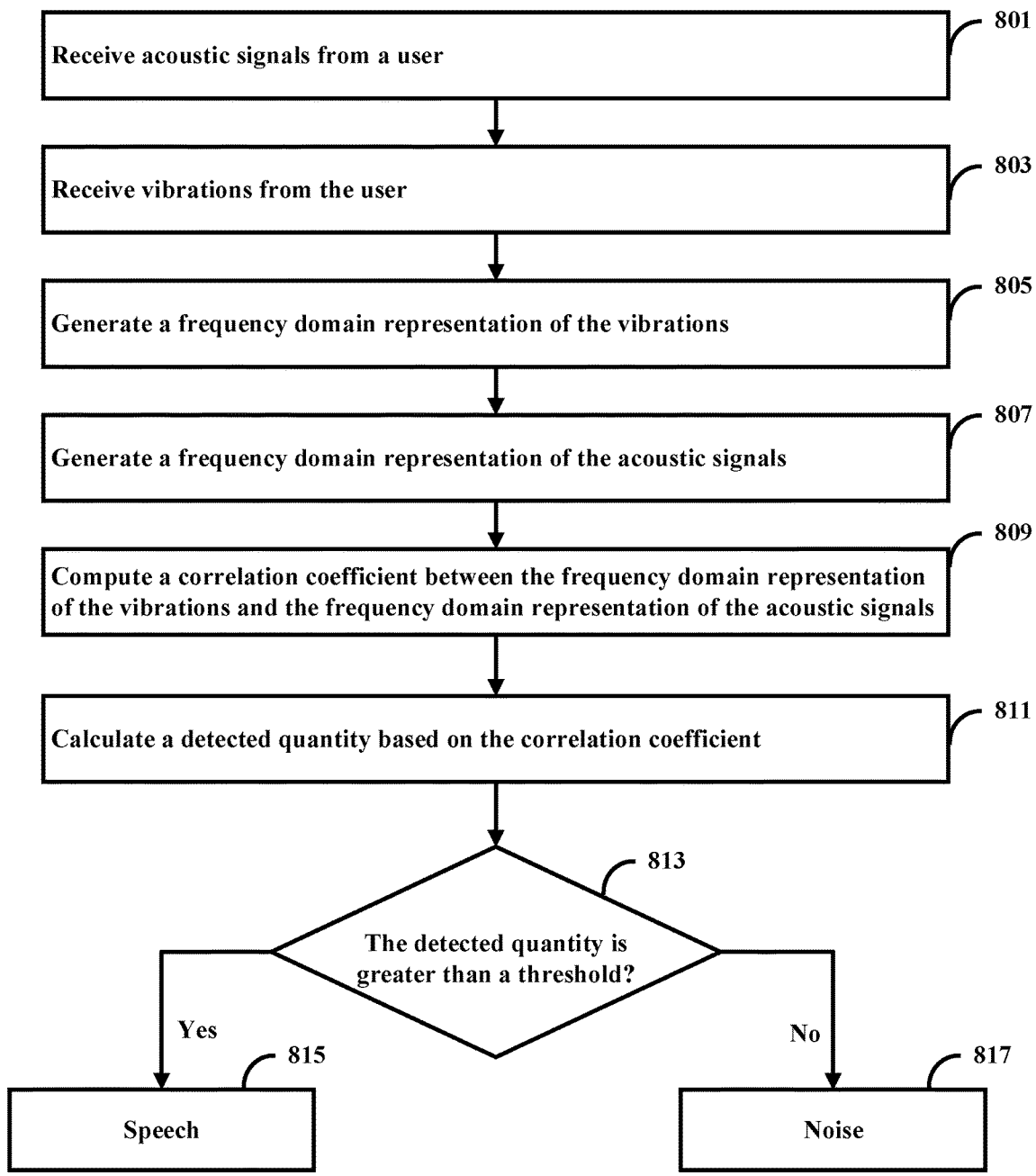
FIG. 8 illustrates a flowchart of voice activity detection, according to some embodiments of the present disclosure.

FIG. 8 illustrates a flowchart of a voice activity detection method, according to some embodiments of the present disclosure. The method as depicted by the flowchart may be performed by one or more of the acoustic signal processing devices as described above, for example, acoustic signal processing device 100 to 600. In some embodiments, the method may be performed by a voice activity detector of an acoustic signal processing device. It is to be appreciated that not all operations may be needed to perform the disclosure provided herein. Further, some of the operations may be performed simultaneously, or in a different order than shown in FIG. 8, as will be understood by a person of ordinary skill in the art.

In 801, a voice activity detector of an acoustic signal processing device may receive acoustic signals. In some embodiments, a microphone of the acoustic signal processing device may detect the acoustic signals and send the acoustic signals to the voice activity detector. Consistent with some embodiments of the present disclosure, the acoustic signal processing device may include a beamforming module and at least two microphones. The beamforming module may synthesize acoustic signals acquired by the at least two microphones and send the synthesized acoustic signals to the voice activity detector.

In 803, the voice activity detector may receive vibrations. In some embodiments, a sensor of the acoustic signal processing device may detect vibrations and sent the vibrations to the voice activity detector. The sensor may include an inertial sensor (e.g., accelerometer or gyroscope), a bone conduction sensor, etc.

In 805, the voice activity detector may generate a frequency domain representation of the vibrations. In some embodiments, the generation may be based on:

$$Y_2(w,m) = F(X_2(t,m))$$

$Y_2(w,m)$ denotes the frequency domain representation of the vibrations, $X_2(t,m)$ denotes the vibrations in the time domain, w denotes the digital angular frequency, m denotes the number of frames in the time domain, F denotes a time-frequency transformation.

In 807, the voice activity detector may generate a frequency domain representation of the acoustic signals. In some embodiments, the generation may be based on:

$$Y_1(w,m) = F(X_1(t,m)) + N_1(w,m)$$

$Y_1(w,m)$ denotes the frequency domain representation of the acoustic signals, $X_1(t,m)$ denotes the acoustic signals in time domain, w denotes the digital angular frequency, m denotes the number of frames in the time domain, F denotes a time-frequency transformation, $N_1(w,m)$ denotes environmental noise.

In 809, the voice activity detector may compute a correlation coefficient between the frequency domain representation of the vibrations and the frequency domain representation of the acoustic signals.

In some embodiments, the correlation coefficient may be calculated based on:

$$C_{y1y2}(w) = \frac{\Phi_{y1y2}(w)}{\sqrt{\Phi_{y1y2}(w)\Phi_{y2y2}(w)}}$$

$C_{y1y2}(w)$ denotes the correlation coefficient, $\Phi_{y1y2}(w)$ denotes the cross power spectral density of the vibrations (e.g., $Y_2(w,m)$) and the acoustic signals (e.g., $Y_1(w,m)$, $\Phi_{y1y1}(w)$ denotes the power spectral density of the acoustic signals, $\Phi_{y2y2}(w)$ denotes the power spectral density of the vibrations, w denotes the digital angular frequency.

In 811, the voice activity detector may calculate a detected quantity in a frequency range based on the correlation coefficient. For example, the voice activity detector may calculate the detected quantity based on:

$$\Gamma = \sum_{w=ind1}^{ind2} |C_{y1y2}(w)|$$

$C_{y1y2}(w)$ denotes the correlation coefficient, w denotes the digital angular frequency, ind1 detects the lower limit of the frequency range, and ind2 denotes the upper limit of the frequency range.

In some embodiments, the frequency range may be determined by the frequency range of the jaw vibration signal of a user, and may also be determined by the sensor sensitivity. For example, the frequency range of the jaw vibration signal of a user may be from 100 Hz to 1.5 KHz.

In 813, the processor may determine if the detected quantity is greater than a threshold. In some embodiments, a preset threshold may be used for voice activity detection. For example, if the detected quantity is greater than the threshold, it may indicate that a speech of a user is detected in the acoustic signals. As another example, if the detected quantity is not greater than the threshold, it may indicate that the acoustic signals may include noise or interference signals. Consistent with some embodiments, the acoustic signal processing device may be configured to suppress the noise or the interference signals in the acoustic signals.

In 815, the processor may determine that a speech of a user is detected when the detected quantity is greater than the threshold.

In 817, the processor may determine that the acoustic signals may include noise or interference signals when the detected quantity is not greater than the threshold.

It is appreciated that the description of the correlation coefficient is provide for illustration purposes, and is not intended to limit the scope of the present disclosure. In some embodiments, the correlation coefficient may be used to determine whether a speech of a user is detected and computed in accordance with various manners. For example, the correlation coefficient may be computed based on the vibrations and the acoustic signals in time domain. As another example, the correlation coefficient may be computed based on a frequency domain representation of the vibrations and a frequency domain representation of the acoustic signals. The correlation coefficient may be compared with a preset threshold. If the correlation coefficient is greater than the preset threshold, voice activity detector may determine that a speech of a user is detected.

In some embodiments, the method as depicted in FIG. 8 may be performed iteratively by the voice activity detector for voice activity detection.

Figure 9:
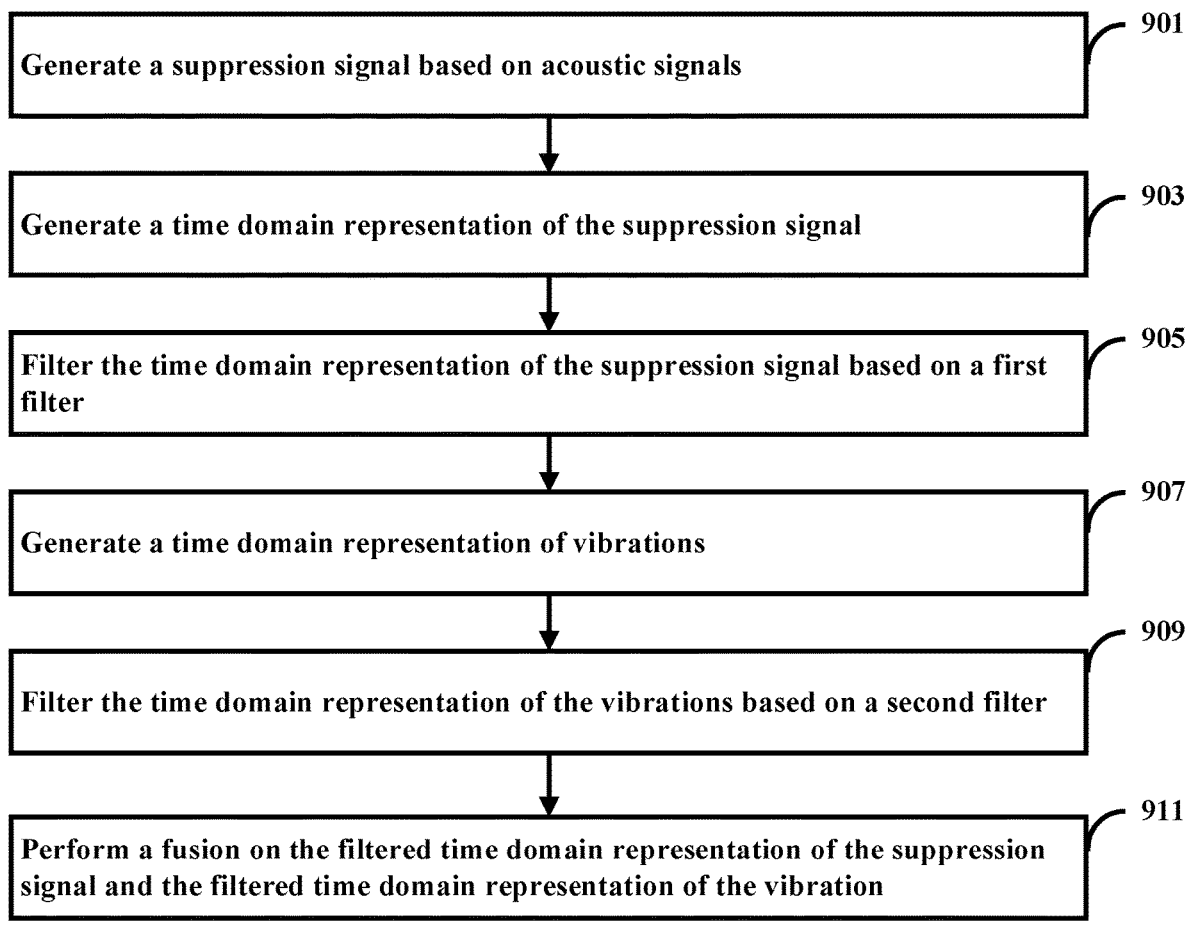
FIG. 9 illustrates a flowchart of noise suppression, according to some embodiments of the present disclosure.

FIG. 9 illustrates a flowchart of noise suppression, according to some embodiments of the present disclosure. It should be noted that the method as described in FIG. 9 may be used in conjunction with the method described in FIG. 8 when noises are detected in acoustic signals. It is to be appreciated that not all operations may be needed to perform the disclosure provided herein. Further, some of the operations may be performed simultaneously, or in a different order than shown in FIG. 9, as will be understood by a person of ordinary skill in the art.

In 901, a processor of an acoustic signal processing device may generate a suppression signal based on acoustic signals. The reception of the acoustic signals may refer to descriptions in FIG. 8 and will be omitted herein. In some embodiments, the suppression signal may be generated based on:

$$Z(w,m) = \begin{cases} Y_1(w,m) & \Gamma > \Delta \\ \mu Y_1(w,m) & \Gamma < \Delta \end{cases}$$

$Z(w,m)$ denotes the suppression signal, $Y_1(w,m)$ denotes the frequency domain representation of the acoustic signals, $\mu$ denotes suppression factor, $\Delta$ denotes a preset threshold used for determining whether the acoustic signals include noises or interference signals. $\Gamma$ denotes the detected quantity. If the detected quantity is greater than $\Delta$, the processor may determine that there are no noises or interference signals in the acoustic signals. Otherwise, the processor may perform noise suppression by applying the suppression factor to the frequency domain representation of the acoustic signals.

In 903, the processor of the acoustic signal processing device may generate a time domain representation of the suppression signal by converting the suppression signal into the time domain. For example, the processor may generate $z(t)$ by converting $Z(w,m)$, $z(t)$ denotes the suppression signal in the time domain.

In 905, the processor may filter the suppression signal based on a first filter. In some embodiments, the first filter may be a high pass filter.

In 907, the processor may generate a time domain representation of vibrations. In some embodiments, the vibrations may be used to generate a frequency domain representation of the vibrations for voice activity detection. The frequency domain representation of the vibrations may be converted to time domain for noise suppression. For example, the processor may generate $y_2(t)$ by converting $Y_2(w,m)$, $Y_2(w,m)$ denotes the frequency domain representation of the vibrations, $y_2(t)$ denotes the vibrations in the time domain.

In 909, the processor may filter the vibrations based on a second filter. In some embodiments, the second filter may be a low pass filter.

In 911, the processor may perform a fusion on the vibrations and the suppression signal. For example, the processor may perform the fusion based on:

$$u(t) = hpf(z(t)) + lpf(y_2(t))$$

$u(t)$ denotes the noise suppressed signal, $hpf(z(t))$ denotes performing high pass filtering on the suppression signal $z(t)$, $lpf(y_2(t))$ denotes performing low pass filtering on the vibrations $y_2(t)$.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A device for acoustic signal processing, comprising:
   a sensor configured to detect a vibration signal from a user;
   a voice activity detector configured to detect a speech of the user; and
   a microphone configured to receive an acoustic signal from the user,
   wherein the voice activity detector is further configured to detect the speech of the user based on a fusion of a high frequency part of the acoustic signal and a low frequency part of the vibration signal, wherein the at least one processor is in an idle state before the speech of the user is detected, and wherein to detect the speech of the user, the voice activity detector is further configured to:
- generate a frequency domain representation of the vibration signal based on the vibration signal;
- generate a frequency domain representation of the acoustic signal based on the acoustic signal;
- compute a correlation coefficient between the frequency domain representation of the vibration signal and the frequency domain representation of the acoustic signal;
- detect the speech of the user based on the correlation coefficient; and
- determine that the speech of the user is detected when a detected quantity is greater than a threshold, where the detected quantity is expressed by:

$$\Gamma = \sum_{\omega=ind1}^{ind2} |C_{y1y2}(\omega)|,$$

where $C_{y1y2}(w)$ is the correlation coefficient, w is a digital angular frequency, ind1 is a lower limit of a frequency range, and ind2 is an upper limit of the frequency range, the frequency range corresponding to a jaw vibration signal of the user.

2. The device of claim 1, wherein to process the acoustic signal in response to detecting the speech of the user, the at least one processor is further configured to perform keyword detection on the fusion of the acoustic signal and the vibration signal.

3. The device of claim 1, wherein the microphone is a digital microphone or an analog microphone.

4. The device of claim 1, wherein to detect the speech of the user, the voice activity detector is further configured to detect the speech of the user based on the acoustic signal.

5. The device of claim 4, wherein the device further comprises an analog-to-digital converter (ADC) and a filter for processing the acoustic signal.

6. The device of claim 1, further comprising a storage for storing the acoustic signal, wherein the at least one processor is further configured to fetch the acoustic signal from the storage after the speech of the user is detected, wherein the acoustic signal is used for keyword detection and/or speech recognition.

7. The device of claim 1, wherein the correlation coefficient is expressed by:

$$C_{y1y2}(w) = \frac{\phi_{y1y2}(w)}{\sqrt{\phi_{y1y2}(w)\phi_{y2y2}(w)}},$$

where $C_{y1y2}(w)$ is the correlation coefficient, $\phi_{y1y2}(w)$ is the cross power spectral density of the vibration signal and the acoustic signal, $\phi_{y1y1}(w)$ is a power spectral density of the acoustic signal, and $\phi_{y2y2}(w)$ is a power spectral density of the vibration signal.

8. The device of claim 1, further comprising at least one processor configured to process the acoustic signal in response to detecting the speech of the user, and perform detection of keywords on the processed acoustic signal, wherein the keywords are preset as words starting with a vowel with a magnitude of vibration.

9. A system for acoustic signal processing, comprising:
an acoustic signal processing device, comprising:
- a sensor configured to detect a vibration signal from a user;
- a voice activity detector configured to detect a speech of the user;
- a microphone configured to receive an acoustic signal from the user;
- at least one processor configured to process the acoustic signal in response to detecting the speech of the user,
wherein the at least one processor is in an idle state before the speech of the user is detected, and
to detect the speech of the user, the voice activity detector is further configured to:
- generate a frequency domain representation of the vibration signal based on the vibration signal;
- generate a frequency domain representation of the acoustic signal based on the acoustic signal;
- compute a correlation coefficient between the frequency domain representation of the vibration signal and the frequency domain representation of the acoustic signal;
- detect the speech of the user based on the correlation coefficient; and
- calculate a detected quantity in a frequency range based on the correlation coefficient, where the detected quantity is expressed by:

$$\Gamma = \sum_{\omega=ind1}^{ind2} |C_{y1y2}(\omega)|,$$

where $C_{y1y2}(w)$ is the correlation coefficient, w is a digital angular frequency, ind1 is a lower limit of the frequency range, and ind2 is an upper limit of the frequency range, the frequency range corresponding to a jaw vibration signal of the user.

10. The system of claim 9, further comprising a computing device configured to perform keyword detection on the processed acoustic signal.

11. The system of claim 9, wherein the correlation coefficient between the frequency domain representation of the vibration signal and the frequency domain representation of the acoustic signal is computed based on a cross power spectral density of the vibration signal and the acoustic signal.

12. The system of claim 11, wherein the correlation coefficient is expressed by:

$$C_{y1y2}(w) = \frac{\phi_{y1y2}(w)}{\sqrt{\phi_{y1y2}(w)\phi_{y2y2}(w)}},$$

where $C_{y1y2}(w)$ is the correlation coefficient, $\phi_{y1y2}(w)$ is the cross power spectral density of the vibration signal and the acoustic signal, $\phi_{y1y}(w)$ is a power spectral density of the acoustic signal, and $\phi_{y2y2}(w)$ is a power spectral density of the vibration signal.

13. The system of claim 9, wherein the voice activity detector is further configured to determine that the speech of the user is detected when the detected quantity is greater than a threshold.

14. The system of claim 9, wherein the at least one processor is further configured to perform keyword detection on presetting keywords as words starting with a vowel with a magnitude of vibration.

15. A device for acoustic signal processing, comprising:
a sensor configured to detect a vibration signal from a user;
a voice activity detector configured to detect a speech of the user; and
a microphone configured to receive an acoustic signal from the user,
wherein the voice activity detector is further configured to detect the speech of the user based on a fusion of the processed acoustic signal and the processed vibration signal, and
wherein the at least one processor is in an idle state before the speech of the user is detected,
wherein to detect the speech of the user, the voice activity detector is further configured to:
generate a frequency domain representation of the vibration signal based on the vibration signal;
generate a frequency domain representation of the acoustic signal based on the acoustic signal;
compute a correlation coefficient between the frequency domain representation of the vibration signal and the frequency domain representation of the acoustic signal;
detect the speech of the user based on the correlation coefficient; and
determine that the speech of the user is detected when a detected quantity is greater than a threshold, where the detected quantity is expressed by:

$$\Gamma = \sum_{\omega=ind1}^{ind2} |C_{y1y2}(\omega)|,$$

where $C_{y1y2}(w)$ is the correlation coefficient, w is a digital angular frequency, ind1 is a lower limit of a frequency range, and ind2 is an upper limit of the frequency range, the frequency range corresponding to a jaw vibration signal of the user.

16. The device of claim 15, wherein to process the acoustic signal in response to detecting the speech of the user, the at least one processor is further configured to perform keyword detection on the fusion of the processed acoustic signal and the processed vibration signal.

17. The device of claim 15,
wherein the correlation coefficient is expressed by:

$$C_{y1y2}(w) = \frac{\emptyset_{y1y2}(w)}{\sqrt{\emptyset_{y1y2}(w)\emptyset_{y2y2}(w)}},$$

where $C_{y1y2}(w)$ is the correlation coefficient, $\emptyset_{y1y2}(w)$ is the cross power spectral density of the vibration signal and the acoustic signal, $\emptyset_{y1y1}(w)$ is a power spectral density of the acoustic signal, and $\emptyset_{y2y2}(w)$ is a power spectral density of the vibration signal.

18. The device of claim 15, further comprising at least one processor configured to process the acoustic signal and the vibration signal in response to detecting the speech of the user by filtering the acoustic signal using a high pass filter and by filtering the vibration signal using a low pass filter, and perform detection of keywords on the processed acoustic signal, wherein the keywords are preset as words starting with a vowel with a magnitude of vibration.

19. The device of claim 15, wherein the at least one processor is further configured to perform detection of keywords on the processed acoustic signal, wherein the keywords are preset as words starting with a vowel with a magnitude of vibration.

* * * * *